(12) United States Patent
Curtis et al.

(10) Patent No.: US 7,591,626 B2
(45) Date of Patent: Sep. 22, 2009

(54) LOADING MECHANISM FOR CARGO CONTAINERS

(76) Inventors: Casey L. Curtis, 1095 N. Verde Ave., Ontario, OR (US) 97914; Gordon L. Curtis, 1095 N. Verde Ave., Ontario, OR (US) 97914

(*) Notice: Subject to any disclaimer, the term of this patent is extended or adjusted under 35 U.S.C. 154(b) by 33 days.

(21) Appl. No.: 11/777,141

(22) Filed: Jul. 12, 2007

(65) Prior Publication Data
US 2007/0264109 A1 Nov. 15, 2007

Related U.S. Application Data

(63) Continuation-in-part of application No. 11/262,619, filed on Oct. 28, 2005, now abandoned.

(51) Int. Cl.
*B60P 1/00* (2006.01)
(52) U.S. Cl. ...................... 414/442; 414/543
(58) Field of Classification Search ............. 414/458, 414/498, 546, 459, 442, 543
See application file for complete search history.

(56) References Cited

U.S. PATENT DOCUMENTS

| | | | |
|---|---|---|---|
| 2,792,008 A | 5/1957 | Glenn | |
| 3,541,598 A | 11/1970 | Dousset | |
| 3,719,392 A | 3/1973 | Russell | |
| 3,749,438 A | 7/1973 | Loomis et al. | |
| 3,980,185 A | 9/1976 | Cain | |
| 4,068,878 A | 1/1978 | Wilner | |
| 4,153,169 A | 5/1979 | Cipkowski | |
| 4,394,101 A | 7/1983 | Richer | |
| 4,547,118 A | 10/1985 | Pittenger | |
| 4,647,267 A | 3/1987 | Hund, Jr. | |
| 4,728,234 A | 3/1988 | Reynard | |
| 4,911,318 A | 3/1990 | Bishop | |
| 4,920,587 A | 5/1990 | Kerr | |
| 5,082,417 A | 1/1992 | Vlaanderen | |
| 5,108,247 A | 4/1992 | Vlaanderen | |
| 5,116,191 A | 5/1992 | Van | |
| 5,213,466 A | 5/1993 | Bubik | |
| 5,245,838 A | 9/1993 | Cavalea, III | |
| 5,290,138 A | 3/1994 | Smart et al. | |
| 5,427,495 A | 6/1995 | Vlaanderen | |
| 5,800,114 A * | 9/1998 | Secondi | 414/458 |
| 5,967,735 A | 10/1999 | Smart et al. | |
| 6,065,942 A | 5/2000 | Glidden et al. | |
| 6,105,843 A | 8/2000 | Dollesin | |
| 6,123,497 A | 9/2000 | Duell et al. | |
| 6,158,947 A | 12/2000 | Goiran et al. | |
| 6,210,088 B1 * | 4/2001 | Crosby | 410/35 |
| 6,558,104 B1 | 5/2003 | Vlaanderen et al. | |
| 6,705,823 B2 | 5/2004 | Bohata | |
| 6,749,388 B1 | 6/2004 | Schmidt | |
| 6,749,389 B1 | 6/2004 | Vlaanderen | |
| 7,341,419 B1 | 3/2008 | Fink et al. | |

(Continued)

*Primary Examiner*—Charles A Fox
(74) *Attorney, Agent, or Firm*—Stephen M. Nipper; Dykas, Shaver & Nipper, LLP

(57) ABSTRACT

A self-contained lift truck capable of loading a cargo container by engaging an end of the container, lifting the end of the container, moving the truck toward the container until it contacts the container, pulling the container forward until it is level on the truck, and then locking the container on the truck. During loading, the container never slides along the ground, avoiding damage to the ground.

14 Claims, 15 Drawing Sheets

U.S. PATENT DOCUMENTS

2002/0105199 A1 8/2002 Formanek et al.
2004/0156702 A1 8/2004 Sulameri
2004/0223835 A1 11/2004 Tovim
2005/0079038 A1 4/2005 Vlaanderen et al.

* cited by examiner

LOADING MECHANISM FOR CARGO CONTAINERS

PRIORITY

This application is a continuation-in-part of application Ser. No. 11/262,619, filed Oct. 28, 2005, entitled "Loading Mechanism For Cargo Containers," having the same inventorship, now abandoned, the disclosure of which is incorporated by reference.

FIELD OF THE INVENTION

The invention relates to an apparatus for loading a cargo container onto a vehicle or trailer, and more particularly to a self-contained cargo loading and transport vehicle.

BACKGROUND OF THE INVENTION

Cargo items have long been transported as containerized freight inside rectangular closed boxes, one example of which measures roughly 8 feet wide, 8 feet high, and 20 to 50 feet long. Fully loaded, these containers are often very heavy, approaching 20 tons.

Recently, users have begun to use these containers primarily for storage of residential and commercial materials rather than merely for shipment. For example, a container may be delivered by a storage company to a residence, where the users may load the material into the container at their convenience. Later, the storage company accepts the container and delivers it to a long-term storage facility. Because these types of users are not associated with the freight industry, their facilities often have landscaping, driveways, sidewalks, and other loading zones that are not capable of withstanding abuse. A traditional loading and transport vehicle, often called a hook truck, will attach a lift mechanism to the container and lift one end of the container, pull the container up and forward, dragging the other end of the container along the ground, driveway, or roadway, until the container is fully loaded onto the hook truck. Loading the container in this way damages the supporting surface when that surface is not specially prepared for handling freight.

Alternatively, it is common to use a forklift or similar independent lift device to load a container onto a vehicle. A difficulty encountered by using a forklift is that a forklift requires a great deal of room to maneuver beside the container and vehicle during loading and unloading.

A third way of loading a container onto the truck uses a jack arrangement to lift the four corners of the container, so that the truck can be driven underneath it; or alternatively, the jacks have wheels so that the container can be rolled onto the truck. A difficulty encountered using this method is that it requires manual labor and considerable assembly and disassembly time to set up the jacks.

Containers are often loaded onto trailers for transport with a semi-articulated tractor-trailer combination. Typically, containers are loaded onto the trailer from the side using a forklift, or from above using an overhead crane to lift the container from its storage location, swing the container directly over the trailer and then set the container onto the trailer. A forklift takes a considerable amount of maneuvering space. An overhead crane requires expensive capital investment. Either a crane or a forklift takes a large space to operate. In addition, both methods require a place to store the forklift or crane when not in use, as neither can be used to transport the container any appreciable distance. A separate forklift or crane must be provided to unload the vehicle once it arrives at its destination.

Thus, the invention provides a way to load a container onto a transport vehicle without damaging the surface on which the container rests and while using a minimal amount of space and a minimum of capital investment. The invention also provides for a container transport vehicle with an integral loading mechanism so that it may be used to load the container at the departure point and unload it at the destination.

Additional advantages and novel features of the invention will be set forth in part in the following description and will become apparent to those skilled in the art upon examination of the description, or may be learned by practice of the invention. The objects and advantages of the invention may be realized and attained by means of the instrumentalities and combinations particularly pointed out in the appended claims.

SUMMARY OF THE INVENTION

An embodiment of the present invention is made up of an engagement assembly designed to grip a generally rectangular cargo container using engagement points provided on the container, a lift assembly capable of lifting at least one end (the front end) of the container, a carriage that moves underneath the container during loading, and a control system which controls the interaction of the above components. In operation, a human operator uses the control system to move the engagement assembly next to the container, grip it securely, and then raise one end of the container using the lift assembly. The other end (the rear end) of the container remains on the ground. The carriage moves underneath the container until it contacts the bottom of the container. The lift assembly then pulls the container onto the carriage. The carriage has a set of rollers at the point of contact with the container so that the container can easily roll forward onto the carriage. The lift assembly then continues to move the container onto the carriage until it is in its final position for transport. In the final position, the container is supported at the rear end by a bed of rollers and at the front end by the engagement assembly and the lift assembly. During this operation, no point of the container slides along the ground or support surface.

Unloading the container from the transport is the reverse of the loading process. The operator uses the control to cause the lift mechanism to push the container towards the rear of the carriage. As the container rolls off the carriage, it tilts until the rear end of the container contacts the ground. The lift assembly then raises the front end of the container from the carriage and the carriage moves from underneath the container. The lift assembly continues to move the container in synchronization with the motion of the carriage so that the rear end of the container remains still. After the container is clear of the carriage, the lift assembly lowers the front end of the container to the ground, and then the engagement assembly disengages from the container.

An embodiment of the present invention may be used to load a container onto a trailer. First, the container is loaded onto the carriage as described above. Then, the carriage is positioned adjacent to the front of the trailer so that the container can be slid towards the rear, onto the length of the trailer. The lift assembly pushes the container backwards off of the carriage onto the trailer until the container is completely supported by the trailer, the engagement assembly releases the front of the container, and the entire mechanism is moved away from the trailer. Loading a container onto the mechanism is the reverse of the process just described.

Using embodiments of the invention, the container can be loaded from the ground onto the mechanism and then loaded onto the trailer in a minimum of space. No jacks or external loading equipment is required.

The purpose of the foregoing summary is to enable the United States Patent and Trademark Office and the public generally, and especially the scientists, engineers, and practitioners in the art who are not familiar with patent or legal terms or phraseology, to determine quickly from a cursory inspection, the nature and essence of the technical disclosure of the application. The summary is neither intended to define the invention of the application, which is measured by the claims, nor is it intended to be limiting as to the scope of the invention in any way.

DESCRIPTION OF THE PREFERRED EMBODIMENTS

Figure 1:
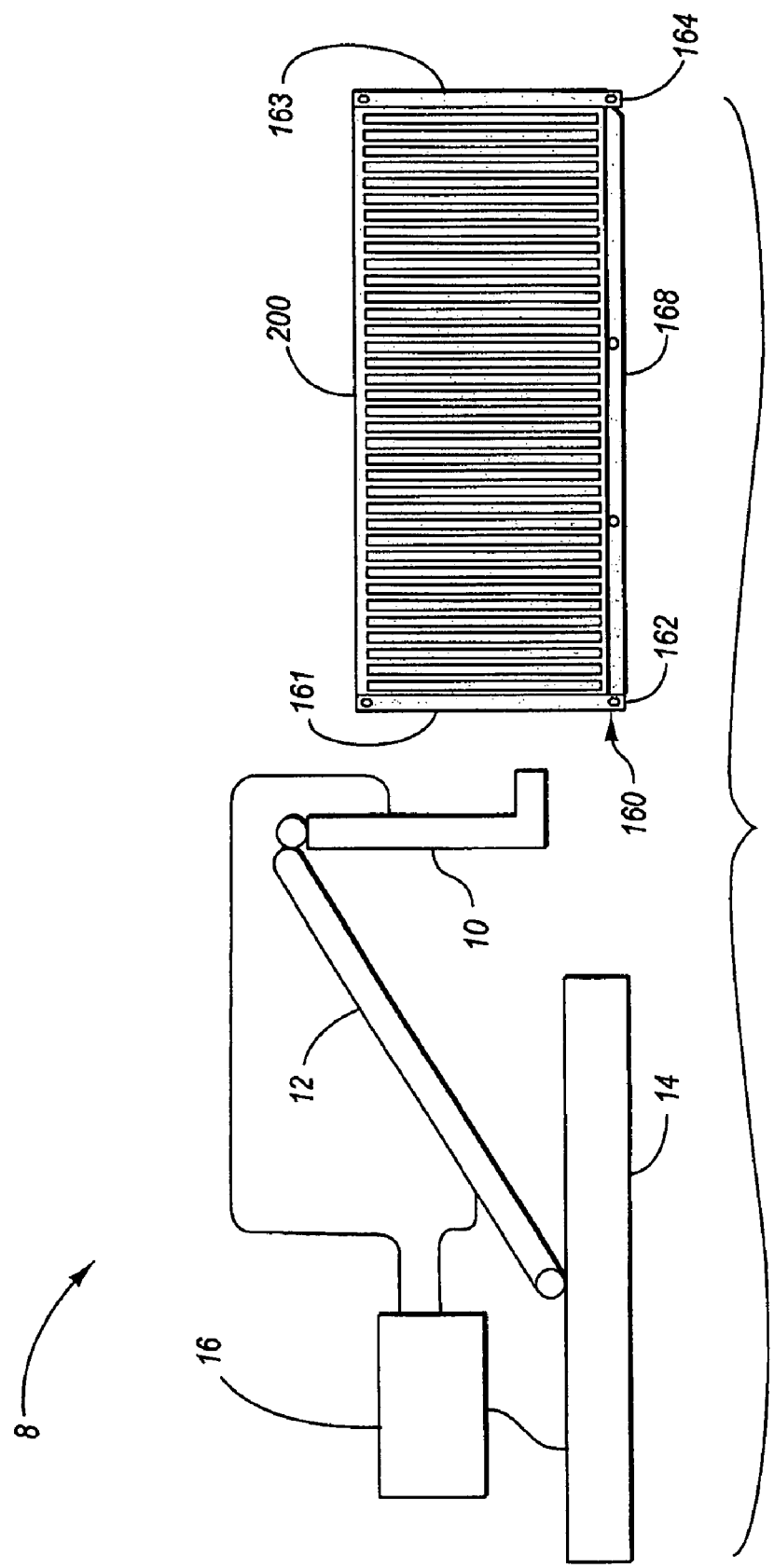
FIG. 1 is a block diagram of an embodiment of the present invention.

While the invention is susceptible of various modifications and alternative constructions, certain embodiments thereof have been shown in the drawings and will be described below in detail. It should be understood, however, that there is no intention to limit the invention to the specific form disclosed; rather, the invention is to cover all modifications, alternative constructions, and equivalents falling within the spirit and scope of the invention as defined in the claims. For example, while embodiments of the present invention were developed in the form of a truck, the invention is not limited to use on a truck and may be used with other vehicles, such as railroad cars. While the invention is not limited to use as a truck, it is expected that various embodiments of the invention will be particularly useful in such devices. Accordingly, the drawings and description of the preferred embodiment are to be regarded as illustrative in nature, and not as restrictive in nature.

Referring now to FIG. 1, an embodiment of the present invention, a lift mechanism 8, includes four systems working in concert. The first system is an engagement assembly 10 capable of securely gripping a container 200. The second system is a lift assembly 12 capable of lifting container 200. The third system is a moveable carriage 14. The fourth system is a control system 16 that controls the other 3 systems. For reference purposes, "rear," "rearward," and "aft" refer to direction extending to the right on FIG. 1; "front," "foreword," and "fore" refer to direction extending to the left on FIG. 1. "Right" and "right side" refer to the direction to the right when facing forward. Similarly, "left" and "left side" refer to the direction to the left when facing forward.

The cargo container 200 being generally rectangular in shape, having a front end 161, a rear end 163, a bottom 168 defining four corners, the front end corners each having at least an end port and a side port, the rear end corners each having at least a bottom port. FIG. 1 showing the near side of cargo container's front end port 160, front side port 162 and bottom port 164. The far side's front end port, front side port and bottom port are hidden from view.

Figure 2:
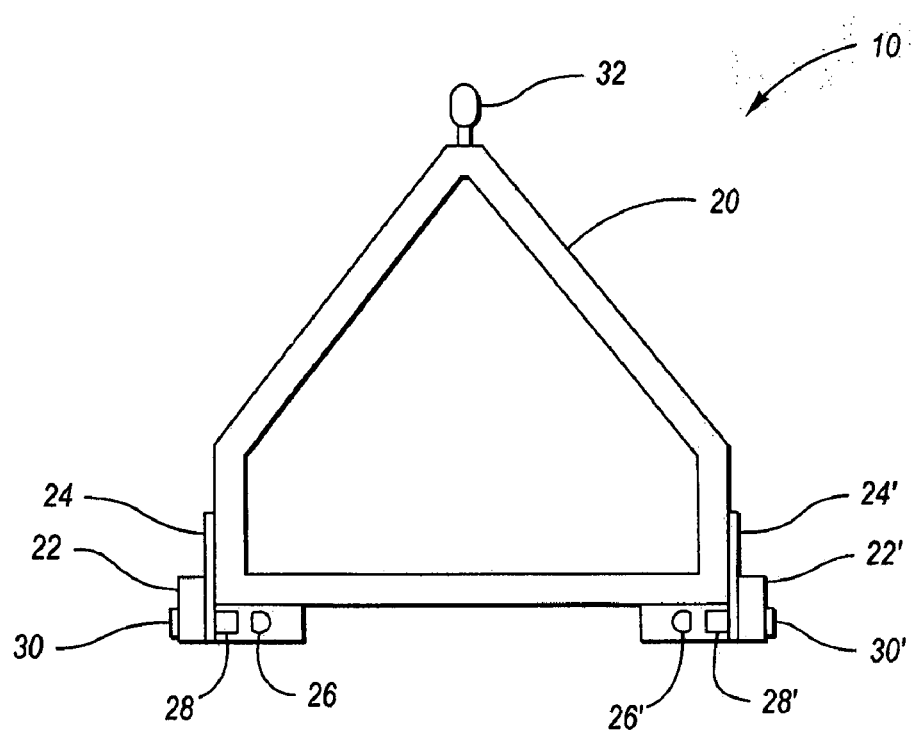
FIG. 2 shows an embodiment of the engagement assembly.

An embodiment of the engagement assembly is shown in FIG. 2. Engagement assembly 10 includes a roughly triangular, rigid bridle 20 and a pin support structure 22 attached to bridle 20 at a vertex. The connection of support structure 22 is strengthened by a gusset 24 (see also FIG. 4). A fixed pin 26 is rigidly attached to the support structure 22. The fixed pin 26 configured for insertion into an end port 160 of the container. A movable pin 28 is moveably attached to support structure 22 and moved by an actuator 30. The movable pin 28 is configured for insertion into a side port 162 of the container. A second support structure 22', gusset 24', fixed pin 26', moveable pin 28', and actuator 30' are attached to another vertex of bridle 20 so that the two moveable pins 28, 28' oppose each other.

In a preferred embodiment, bridle assembly 20, carriages 22/22', gussets 24/24', and fixed pins 26/26' are made of steel and welded together. Pins 28/28' may also be made of steel. Actuators 30/30' may be pneumatic actuators; alternatively, hydraulic, electric, or other actuators may be used.

Bridle 20 does not have to be perfectly triangular. As shown in FIG. 2, the arms of the triangle may be bent so that the support structure 22/22' can be welded flush with the sides of bridle 20, and so that moveable pins 28/28' are generally orthogonal to support structure 22/22'. Alternatively, bridle 20 may be any shape that allows pins 26/26' and 28/28' to be securely supported and properly located, including any polyhedron or other geometric arrangement.

The precise location and number of pins 24/24' and 26/26' depend on the corresponding engagement holes (end ports 160, side ports 162) in container 200. Since many of the dimensions of many containers are standard, support structure 22/22' may be welded in place. However, in another embodiment, support structure 22/22' may be bolted in place to allow engagement assembly 10 to be adjusted to engage other sizes of containers or storage devices. Pins 26/26' and 28/28' may be replaced by clips, hooks, holes, or any other engagement feature required by the design of container 200.

Referring again to FIG. 2, engagement assembly 10 is suspended from lift assembly 12 by a Heim joint 32, also called a rod end bearing. Heim joint 32 allows bridle 20 to rotate in the horizontal and vertical planes, so that the engagement assembly 10 can mate flush with container 200 even when lift assembly 12 is not aligned container 200. Alternatively, Heim joint 32 may be replaced by a ball joint or a combination of hinges and bearings.

Figure 3:
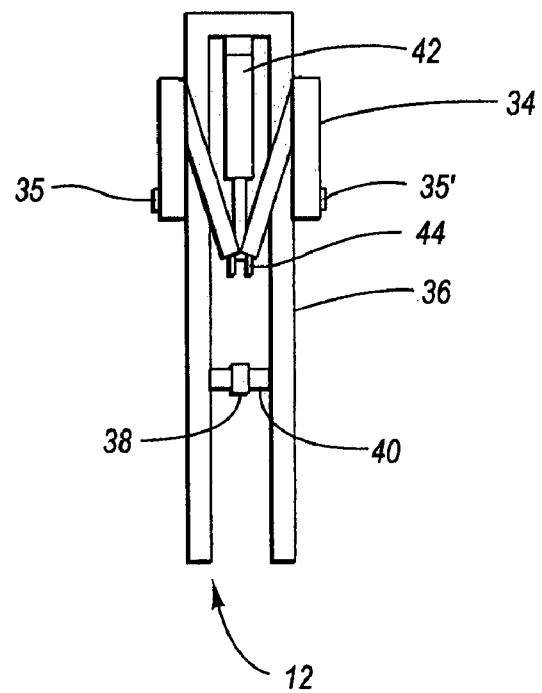
FIG. 3 is a rear view of an embodiment of the lift assembly.

FIG. 3 shows the rear view of an embodiment of lift assembly 12. As shown in FIG. 3, an arm 34 is attached via one or more bearings 35/35' to a lift arm 36, so that arm 34 rotates in the fore-aft plane. An actuator 38 (see also FIG. 4) connects to lift arm 36 through structure 40. A second actuator 42 extends from lift arm 36 to arm 34 to move arm 34 relative to lift arm 36. Fork 44 is attached to the end of arm 34 to connect with Heim joint 32 on engagement assembly 10.

Arms 34 and 36 may be constructed of steel or other sufficiently rigid material. In one embodiment, lift arm 36 is made of a single beam. In another embodiment, lift arm 36 is made of two spaced-apart beams, providing more lateral strength than a single beam. Actuators 40 and 42 are preferably hydraulic actuators; alternatively, other types of actuators may be used.

Figure 4:
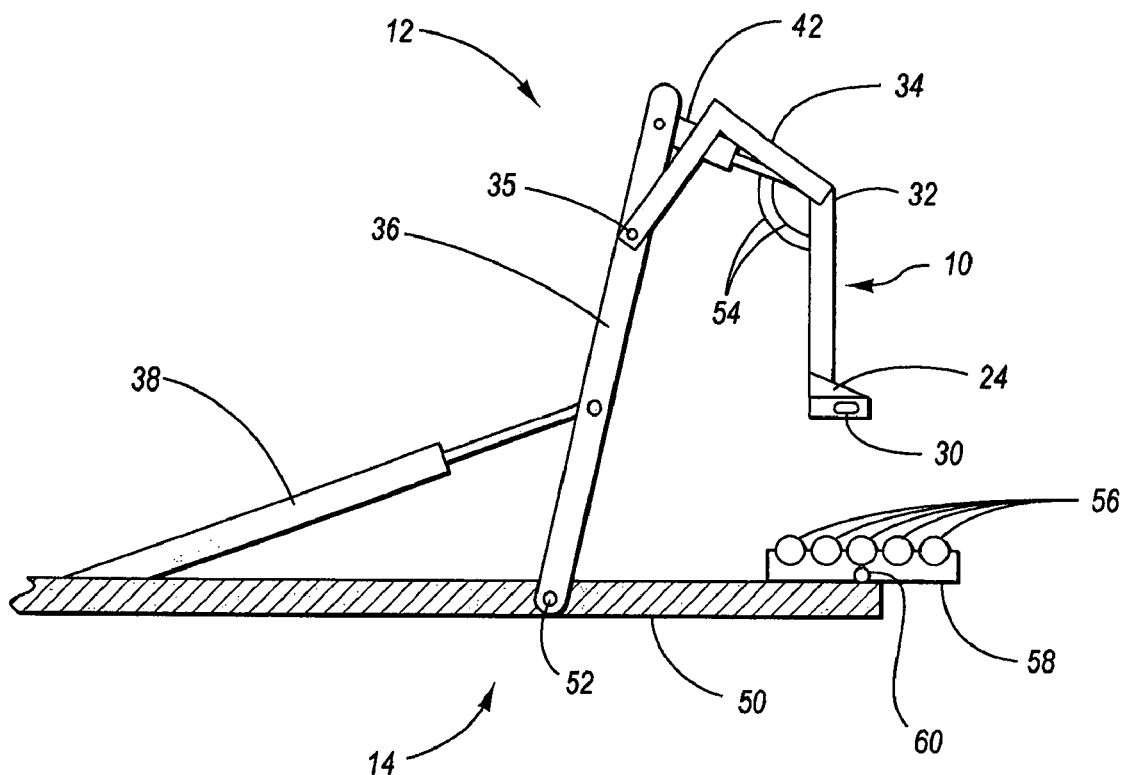
FIG. 4 is a side view showing an embodiment of the lift assembly, an embodiment of the engagement assembly, and an embodiment of the carriage.

Refer now to FIG. 4, a side view of engagement assembly 10, lift assembly 12, and carriage 14. Lift assembly 12 is attached to carriage 14. Lift arm 36, or lift assembly 12, is attached to rigid frame 50, of carriage 14, via bearings 52, allowing lift arm 36 to rotate in the fore-aft plane. Cylinder 38 extends from frame 50 to lift arm 36 to move lift arm 36 relative to frame 50.

One or more hoses 54 provide working fluid to actuator 30. Hoses 54 are attached to the lengths of arm 34 and lift arm 36 in a manner to protect hoses 54 during operation. A portion of the hoses 54 are free of arm 34 and lift arm 36 and pass around joint 32 so that engagement assembly 10 may swing freely without damaging hoses 54 or binding engagement assembly 10. Additional hoses, not shown, conduct working fluid to actuators 38 and 42, and are mounted to arm 34 and lift arm 36 in a similar fashion.

Figure 5:
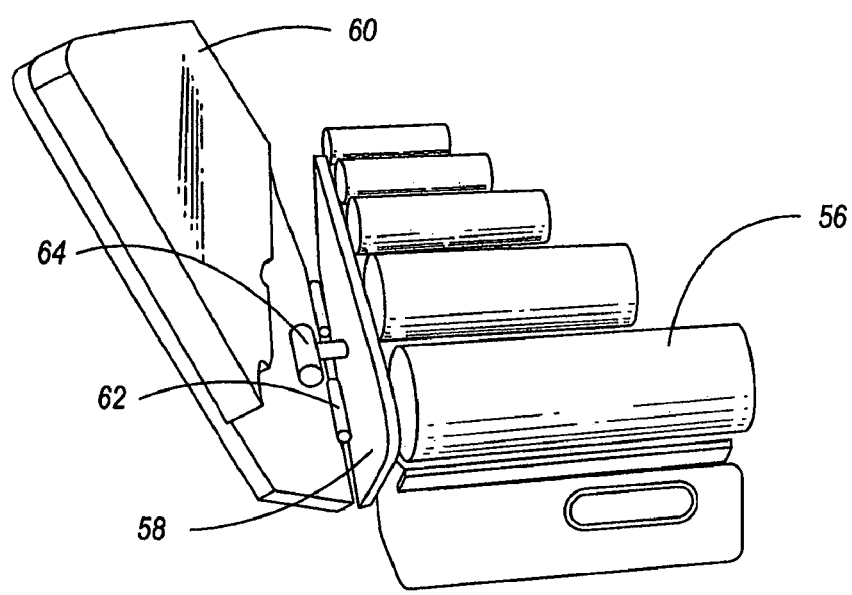
FIG. 5 is a perspective view of a portion of an embodiment of the carriage, including rollers and a guide.

Carriage 14 may include one or more rollers 56. In one embodiment, rollers 56 are attached to frame 50. In another embodiment, a plurality of rollers 56 is mounted to a sub-frame 58, as shown in FIGS. 4 and 5. Sub-frame 58 is mounted to frame 50 by a hinge 60, allowing sub-frame 58 to tilt in the fore-aft plane to engage the bottom of container 200 as it is loaded onto carriage 14. Rollers 56 and sub-frame 58 provide a broad support to the bottom of container 200, so that it does not deform as it is loaded onto carriage 14. In another embodiment, two parallel sets of rollers 56 and sub-frames 58 are mounted to either side of carriage 14 to provide more surface area to support container 200.

FIG. 5 shows an embodiment of rollers 56 and sub-frame 58 in a perspective view. Also shown is a guide 60 mounted to sub-frame 58 by one or more hinges 62. As container 200 is pulled onto rollers 56, guide 60 may be rotated upright to assure that the rear of the container is centered over frame 50 so that container 200 is securely supported. Actuator 64 rotates guide 60 upright, to an engaged position flush with sub-frame 58, and rotates guide 60 outward, counter-clockwise as shown in FIG. 5, to a disengaged position so that the container can be lifted onto the rollers 56 in the event that container 200 is misaligned with the lift assembly 12. In alternative embodiments, guide 60 may be mounted to frame 50 by hinges, or rigidly secured to sub-frame 58 or frame 50.

Figure 7:
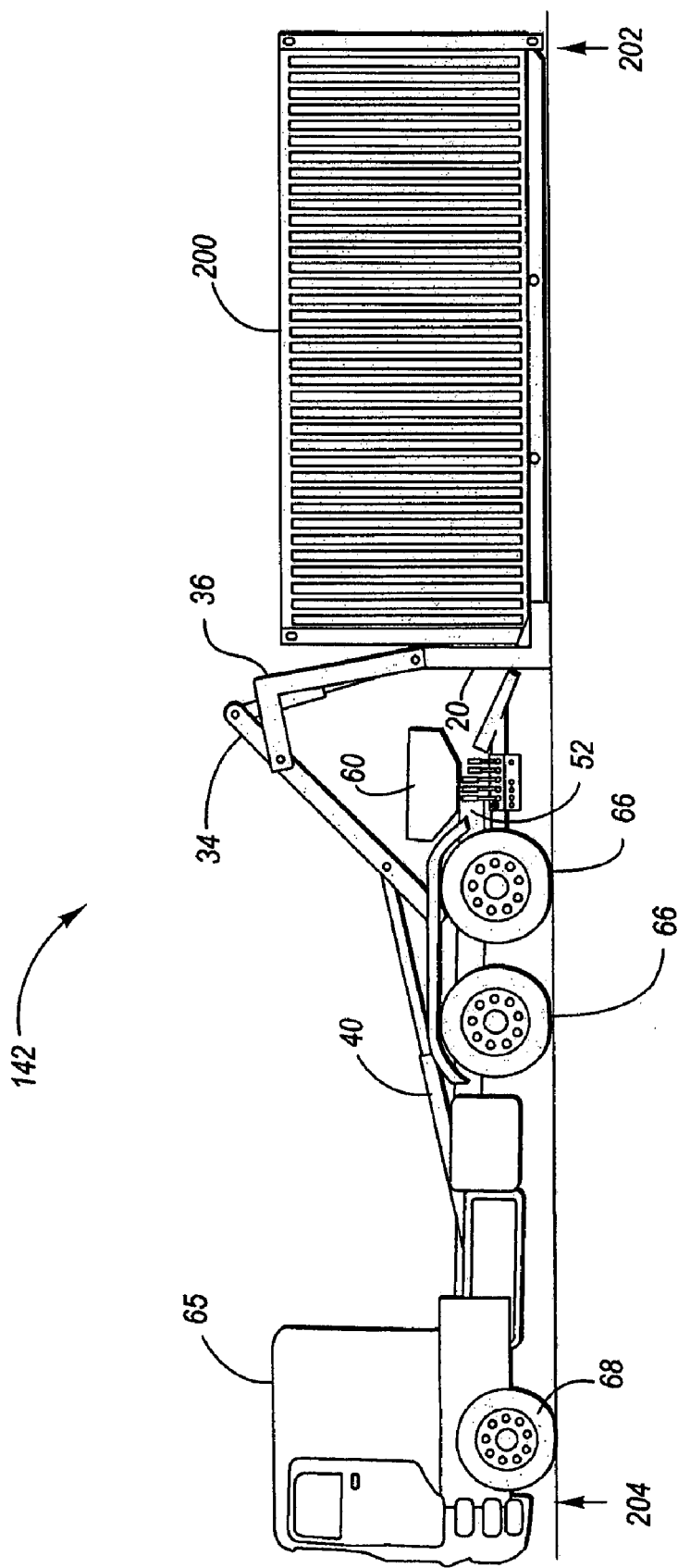
FIGS. 7, 8, and 9 show an embodiment of the present invention at different stages during loading of a container.

FIG. 7 shows another embodiment of the invention, where carriage 14 is embodied as a truck 65 having one or more drive wheels 66 and one or more steering wheels 68. The entire assembly rests on support surface 204.

Figure 6:
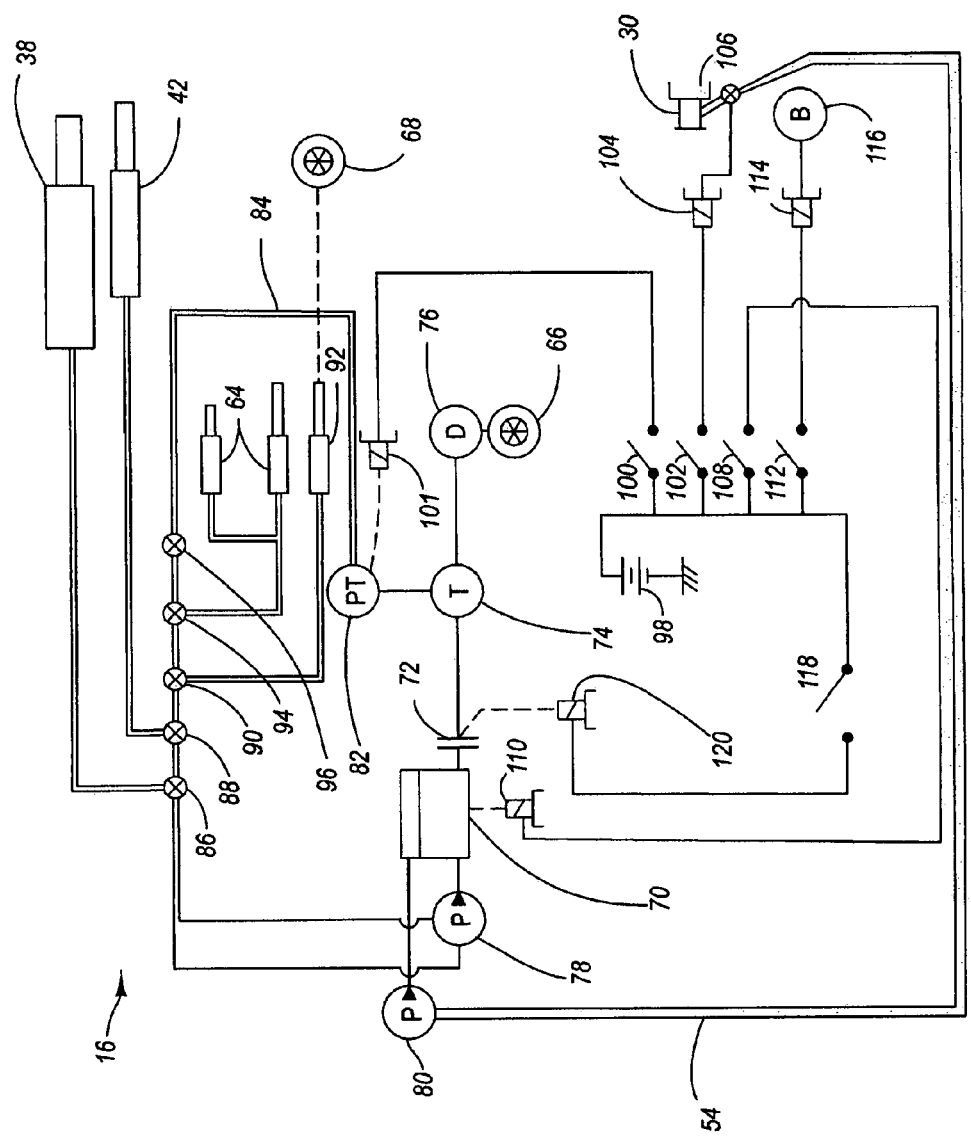
FIG. 6 is a schematic representation of an embodiment of the control system.

An embodiment of control system 16 is shown in FIG. 6, along with various elements of other systems controlled by control system 16. Engine 70 drives a clutch 72, which, when engaged, drives a transmission 74 and a differential 76 to turn drive wheels 66. Engine 70 also drives a pump 78 and a pump 80 to provide pressurized working fluids to various actuators. In a preferred embodiment, pump 78 is a hydraulic pump, and pump 80 is a pneumatic pump. A power take-off unit ("PTO") 82 is connected to transmission 74. In a typical configuration, transmission 74 would transmit power to PTO 82. Here, however, the pressurized working fluid delivered by pump 78 drives PTO 82, which in turn drives transmission 74 and drive wheel 66. In other words, to PTO 82 transmits power in the reverse of the typical mode of operation for a power take-off unit.

Pump 78 drives working fluid through hoses 84 and a series of variable valves. The valves are connected in series starting with variable valve 86, which is connected to and controls actuator 38. Next, variable valve 88 is connected to actuator and controls 42. Next, variable valve 90 is connected to and controls actuator 92. Next, variable valve 94 is connected to and controls actuator 64. And, finally, variable valve 96 is connected to PTO 82.

Control system 16 may also contain a series of switches to energize components in control system 16. The switches conduct electrical current provided by a power source 98. Power source 98 may be a battery; alternatively, power source 98 may be a generator, alternator, or the like. Switch 100 energizes solenoid 101 which engages and disengages power take-off unit 82. Switch 102 energizes solenoid 104, configuring a valve 106 to direct pressurized working fluid to valves 30 and setting the position of pins 28. Switch 108 energizes solenoid 110, setting the speed of engine 70. When the solenoid 110 is de-energized, engine 70 runs at a default idle speed. When solenoid 110 is energized, engine 70 runs at a higher speed, called "high idle", turning pumps 78 and 80 at a speed sufficient to power the various actuators. Switch 112 energizes solenoid 114, activating brakes 116. Brakes 116 may be hydraulic, pneumatic, electric, or other type of brakes. Switch 118 energizes solenoid 120, engaging clutch 72.

In alternative embodiments, solenoids 102, 104, 110, 114, 120, 110 and 116 may be replaced with any actuator capable of performing the desired function. Also, each solenoid and the device it controls may be replaced by an equivalent electrically operated component. For example, solenoid 104 and valve 106 may be replaced by an electrically operated valve, solenoid 114 and brake 116 may be replaced by an electrically operated brake, and so forth. For clarity, the polarity and operation of the switches is described so that closing a switch engages or operates a component; however, any switch may be wired so that opposite polarity or opening a switch may engage or operated a component.

Figure 8:
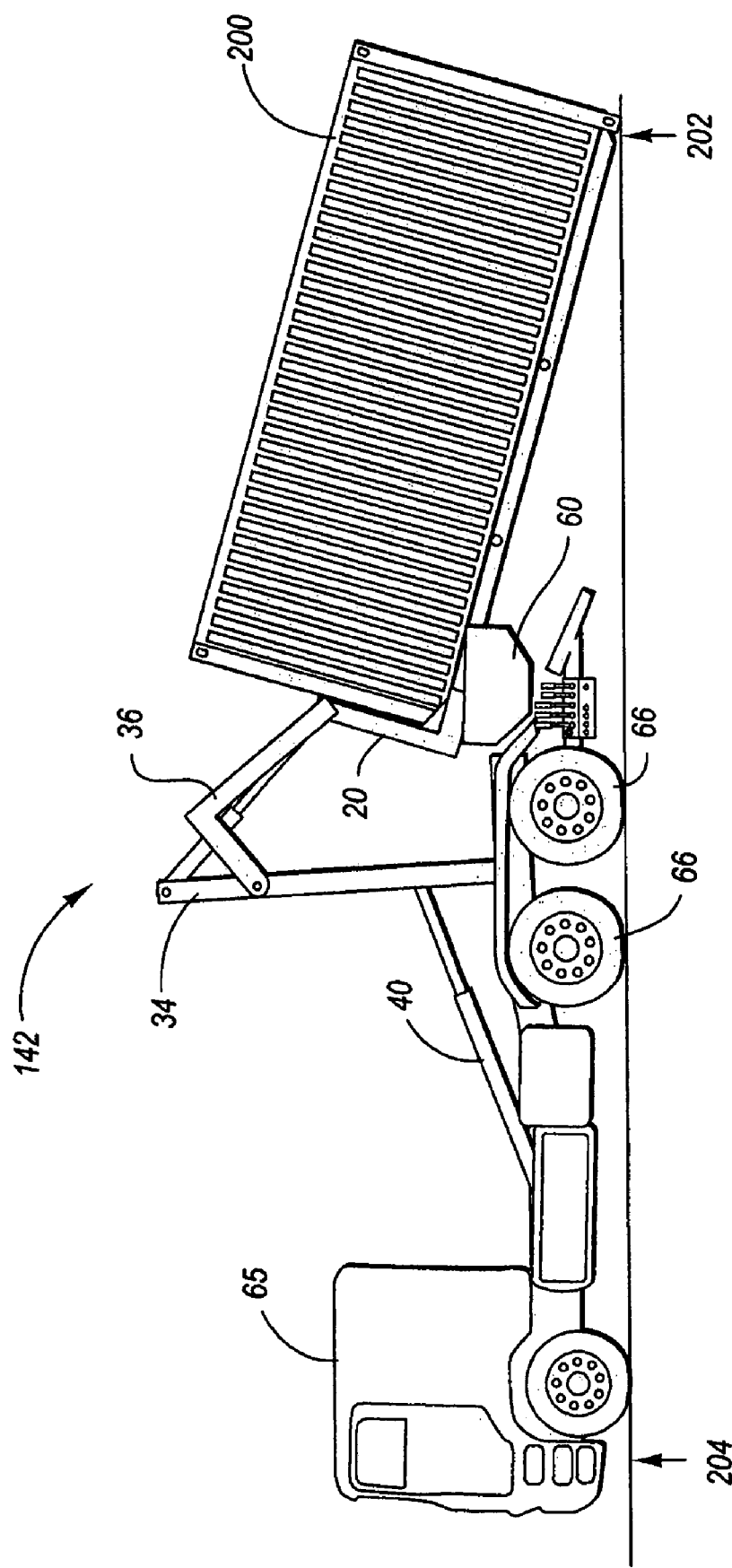
Figure 9:
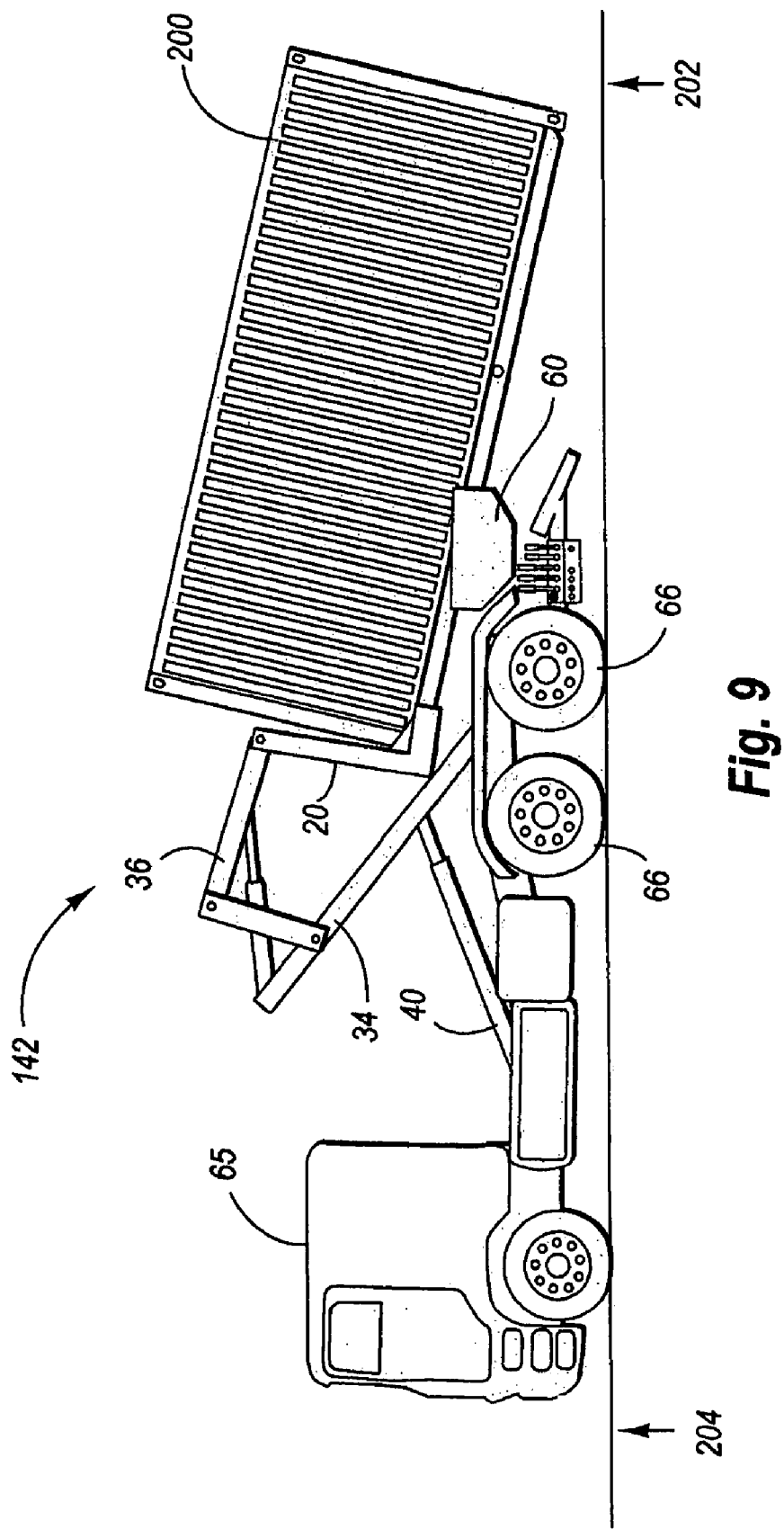
Figure 11:
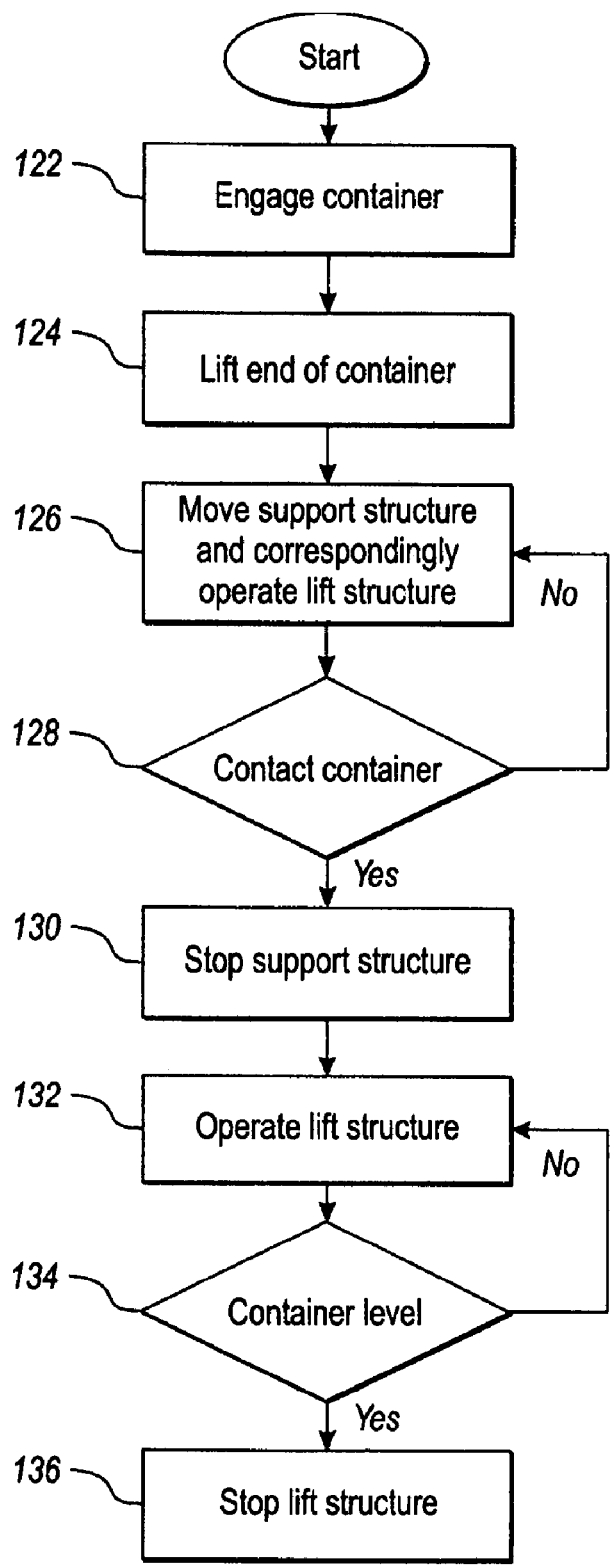
FIG. 11 shows the steps in a method of loading a container according to an embodiment of the present invention.

FIG. 11 shows the steps necessary to load a container onto lift mechanism 8 using the present invention. In step 122, the engagement assembly 10 engages the front end of the container 200. FIG. 7 shows the position of container 200 and engagement assembly 10 after it is engaged to the container. Reference arrow 202 shows the position of the rear end of container 200 relative to the surface on which it rests. Continuing in FIG. 11 at step 124, lift assembly 10 raises the front of container 200. In step 126, carriage 14 is moved rearward. While carriage 14 is in motion, lift assembly 12 moves corresponding to the motion of carriage 14 so that the rear of container 200 remains in contact with the ground and does not move. In step 128, a determination is made whether carriage 14 has contacted container 200. If container 200 is not in contact, operation continues with step 126. When carriage 14 contacts container 200, the motion of carriage 14 is halted in step 130. The position of carriage 14 at step 130 is shown in FIG. 8. Continuing in FIG. 11 at step 132, lift structure 12 continues to operate, pulling container 200 forward onto carriage 14. As container 200 moves forward, the rear end of container 200 rises, as shown in FIG. 9. Continuing in FIG. 11 (step 134), lift structure 14 continues to move until container 200 until a determination is made that container 200 is approximately level, ready for transport. Once container 200 is level, the process stops in step 136.

A human operator may operate control system 16 to execute the steps shown in FIG. 11. Referring to FIG. 6, switch 118 is set to disengage clutch 72. Switch 108 is set to place engine 70 in high idle mode. Switch 102 is set to place pins 28 in a disengaged position. Switch 100 is set to engage the power take-off unit 82. Variable valves 86 and 88 are positioned to operate actuators 38 and 42 respectively, positioning arm 34, lift arm 36 and bridle 20 so that pins 26 are engaged with corresponding holes in the front of container 200. Now, switch 102 is set to place pins 28 to engage corresponding holes in the side of container 200, securely engaging engagement assembly 10 to container 200. This state corresponds to the result of step 122.

Typically, valve 94 is positioned to cause actuators 64 to open guides 60 to perform step 122. However, if carriage 14 is adequately aligned with the long axis of container 200, guide 60 may be left in the closed position to help guide container 200 as it is loaded.

Valve 88 is configured to raise the front of container 200 with arm 34, corresponding to step 124. Variable valve 86 is then configured to continue lifting the container with arm 36, while variable valve 96 is configured to energize PTO 82, moving carriage 14 rearward. This state corresponds to step 126 in FIG. 11.

In a preferred embodiment, variable valve 96 is downstream of variable valve 86 so that as variable valve 86 is configured to increase the speed of actuator 38, less pressurized working fluid is available to PTO 82, slowing down the motion of carriage 14. This inverse relationship between the fluid delivered to actuator 38 and the fluid delivered to PTO 82 allows the operator to be somewhat imprecise in configuring variable valve 86 relative to variable valve 96 to match the speed of lift assembly 12 to carriage 14, while still ensuring that the rear end of container 200 does not slide along the support surface.

As carriage 14 moves, variable valve 90 may be operated to control actuator 92, steering the support unit 14 to align it with container 200. As carriage 14 moves rearward, it will contact container 200, corresponding step 128 in FIG. 11. In an embodiment shown in FIG. 5, rollers 56 mounted to subframe 58 will contact the bottom of container 200. Sub-frame 58 will tilt so that all the rollers 56 come into contact, providing a broad area of support for container 200 as it is lifted from the support surface 204.

When all rollers 56 contact container 200, valve 96 is closed so that the carriage 14 halts, corresponding to step 130. As a precaution, switch 112 may be set to energize brakes 114 to assure that the carriage remains halted.

Variable valve 86 is positioned to energize actuator 38 to pull container 200 forward so that its weight is support entirely on rollers 56 and sub-frame 58. As container 200 moves forward, the rear of container 200 leaves contact with the support surface, corresponding to the position shown in FIG. 9 and step 132 in FIG. 11. Motion continues until container 200 becomes approximately level, corresponding to step 134 in FIG. 11. Variable valve 86 is then closed to bring the container to a halt, corresponding to step 136 in FIG. 11. The final position of container 200 is shown in FIG. 10, where the rear of container 200 is supported primarily by rollers 56, and the front is supported primarily by the engagement assembly 10. In an alternative embodiment, container 200 may rest on frame 50 rather than be supported by lift assembly 10.

At any time during the steps described in FIG. 11, the operator may discretionarily use valve 88 to control the position of engagement assembly 10 relative to lift assembly 14. The valves and switches included in control system 16 allow the operator considerable flexibility in loading container 200 so that no portion of the container slides along the support surface. Flexibility of control is particularly required when the support surface is uneven or sloped.

To unload container 200 from lift mechanism 8, the steps shown in FIG. 11 and described above are performed roughly in reverse order.

Figure 12:
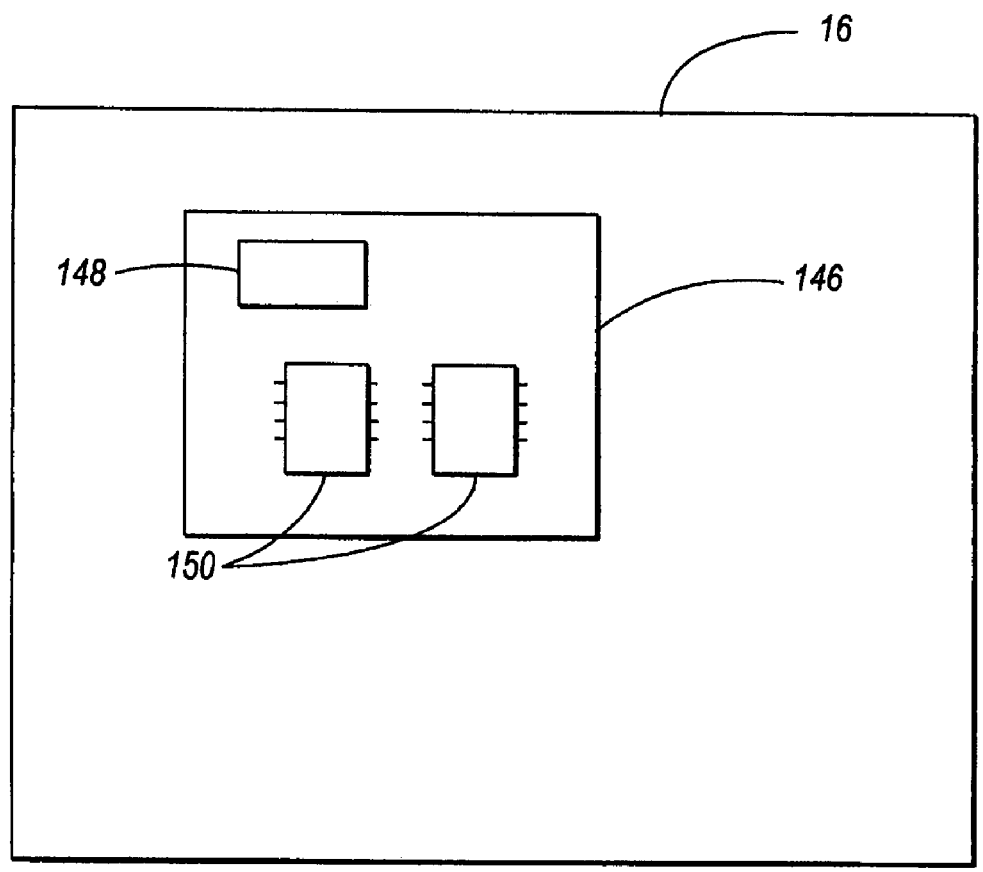
FIG. 12 shows a control system implemented as a computer, according to an embodiment of the present invention.

While the controls in control system 16 operable by a human operator described above are simple and effective, they may be optionally replaced by electrically operated components controlled by a programmable computer 146, containing a central processing unit 148 and memory 150, as shown in FIG. 12. A computerized embodiment of control system 16 eliminates the need for careful monitoring and control by a human operator. Alternatively, the electrically operated components may be controlled by electronic circuitry other than a computer, such as circuitry based on programmable array logic or the like.

Figure 13:
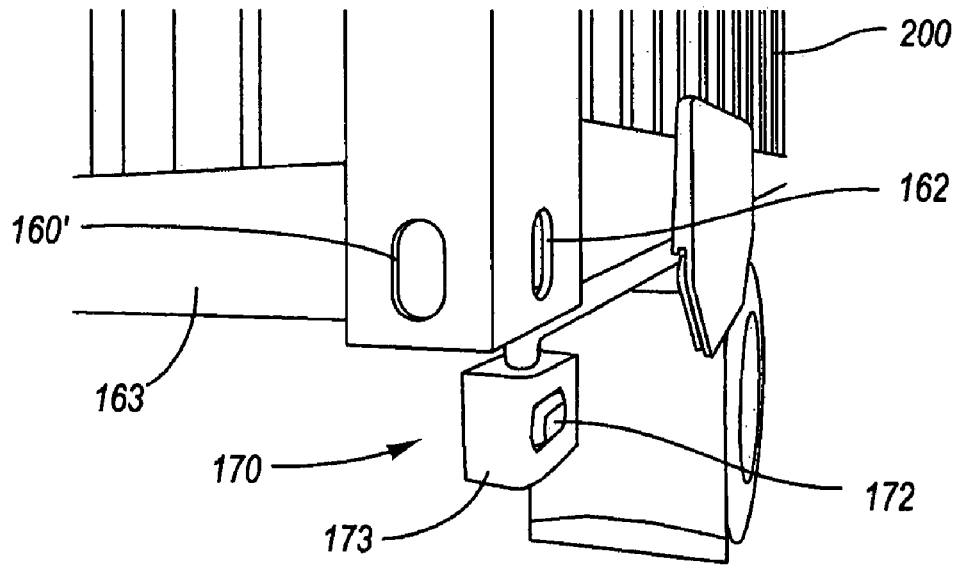
FIG. 13 shows a perspective view of a first embodiment of a locking device in its stored position.
Figure 14:
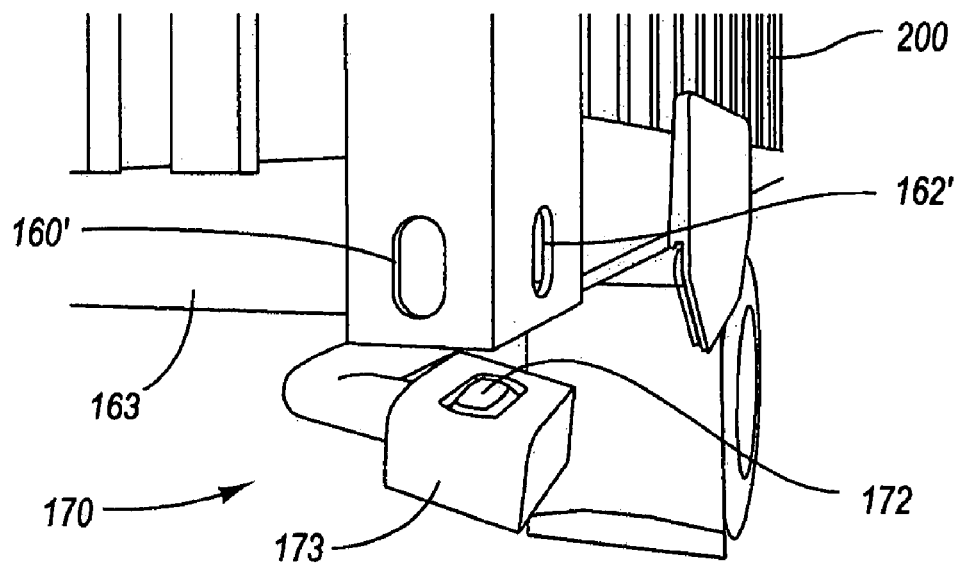
FIG. 14 shows a perspective view of the embodiment of FIG. 13 where the locking device is extended and rotated.
Figure 15:
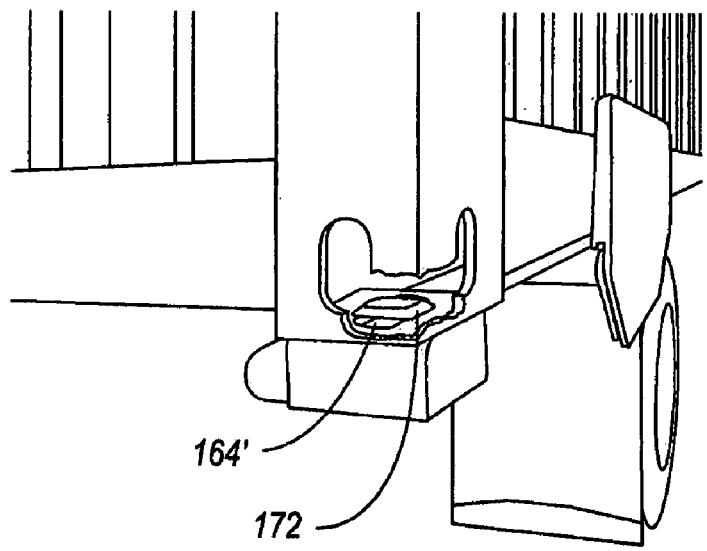
FIG. 15 shows a perspective view of the embodiment of FIG. 13 where the locking device is in its locked position.

In an embodiment shown in FIGS. 13-15, the rear of the container is able to be locked to the truck through use of a locking device 170. As discussed above, a standard cargo container has, at its corners a plurality of engagement holes that are used for tying down cargo containers on cargo ships. These engagement holes including the previously mentioned end ports, side ports and bottom ports. In FIGS. 13-15, one of the rear corners of the rear end 163 of the container 200 can be seen, showing that the rear corner has an end port 160', a side port 162' and a bottom port 164' (shown in FIG. 15).

Figure 16:
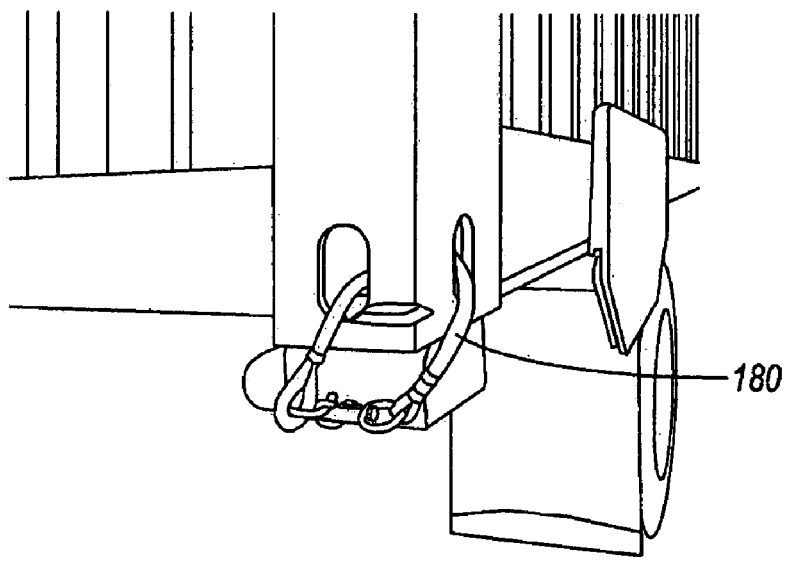
FIG. 16 shows a perspective view of the embodiment of FIG. 13 with a backup attachment.

The locking device (locking assembly) 170 is preferably able to move from a stored position (shown in FIG. 13), extending and rotating (FIG. 14) to a locked position (FIG. 15). The preferred locking device 170 being a twist lock coupling comprising a body 173 holding a spring loaded shaft terminating in latch head 172 therein. With the latch head retracted, the face of the body is brought into connection and alignment with the underside of the corner. The shaft is then extended, pushing the latch head 172 through the bottom port 164. Rotation of the shaft and attached latch head, preferably ninety degrees, allowing the latch head to interlock within the corner via the spring loaded shaft and friction (as shown in FIG. 15). Additionally, as shown in FIG. 16, a chain or other strapping attached to the truck could be looped through the side and rear end ports of the rear corners and be fastened back to the truck, adding a backup attachment in case of the primary backup (the twist lock) were to fail.

The opposite second end corner would likewise be connected to a second locking device, thereby locking the rear end of the container to the truck/trailer or other carrying platform. With the front end of the container being locked to the truck through use of the pins 26/26' and 28/28', the entire container is releaseably locked to the truck and ready for transportation.

Figure 10A:
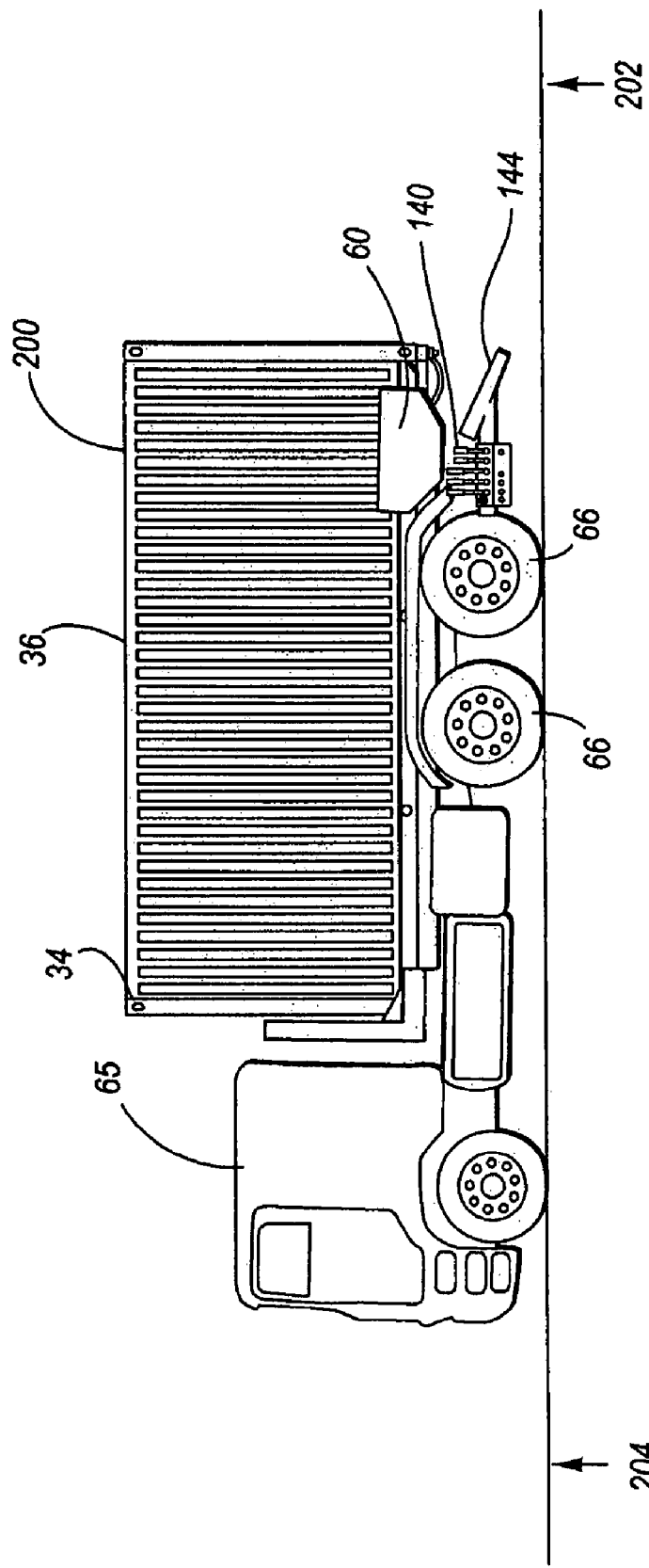
FIG. 10a shows a first embodiment of the present invention at the final stage of loading of a short container and also shows a trailer hitch.

In an embodiment shown in FIG. 10a, engagement assembly 10, lift assembly 12, moveable carriage 14, and control system 16 may be combined into a single apparatus 142, called a lift truck, excluding container 200. FIG. 10a also shows an optional operator's console 140, wherein the valve and switches in control system 16 may be located for convenient access by human operator. Alternatively, the operator's console may be located in the cab of lift truck 142.

Figure 10B:
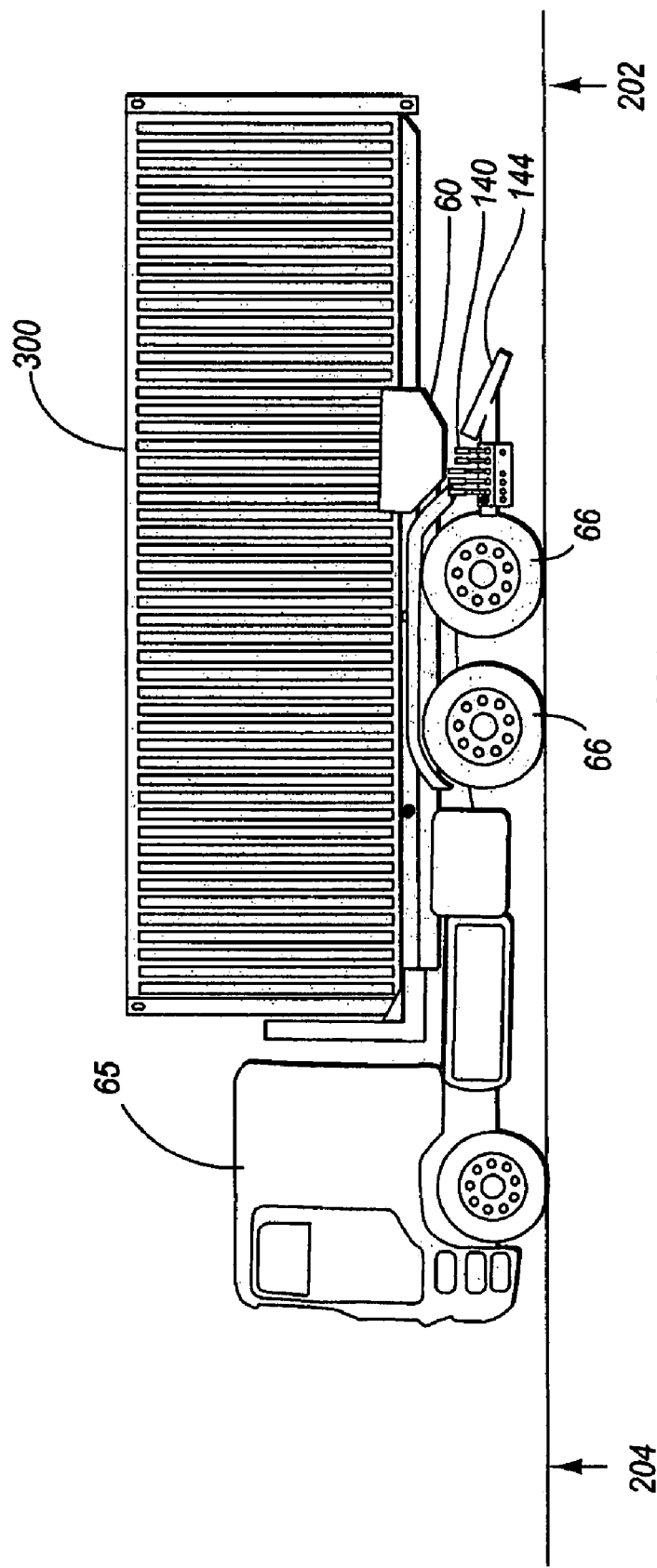
FIG. 10b shows a second embodiment of the present invention at the final stage of loading of a long container and also shows a trailer hitch.

A lift truck is particularly useful when loading and transporting a trailer. Both short and long containers may be loaded onto a lift truck, as shown in FIGS. 10*a* and 10*b*.

Figure 10C:
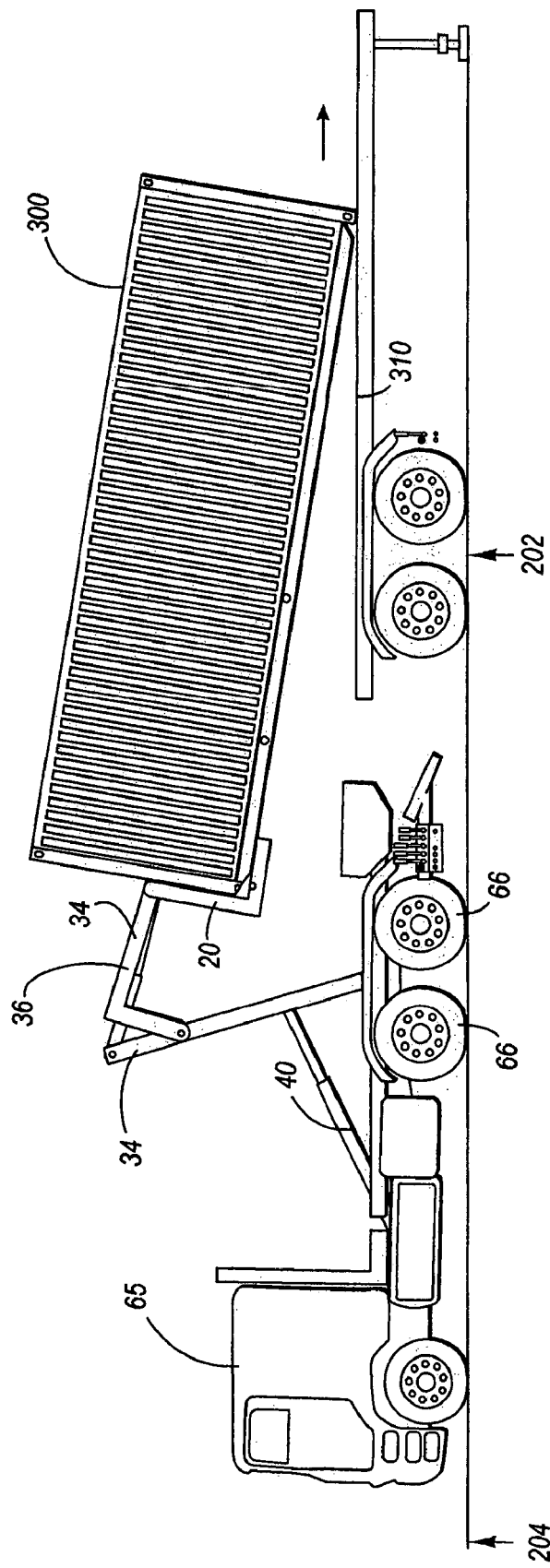
FIG. 10c shows the embodiment of FIG. 10b, showing the optional stage of off-loading the container onto a trailer.
Figure 10D:
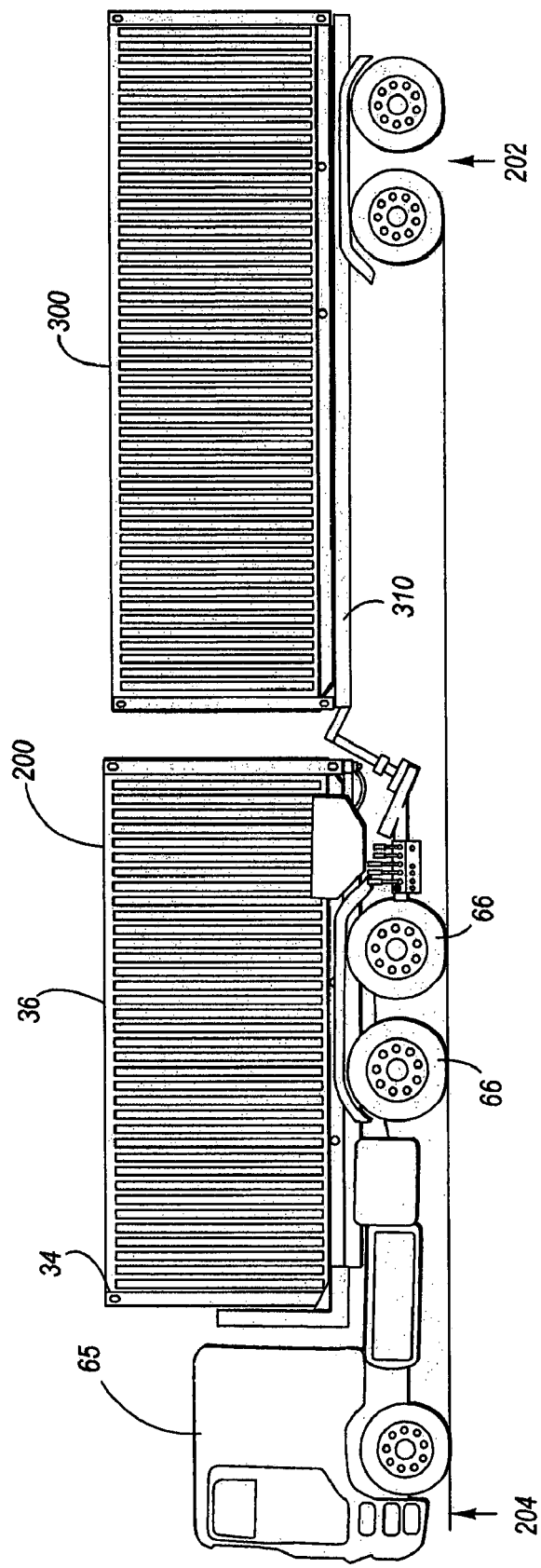
FIG. 10d shows essentially a combination of the embodiments of FIG. 10a and 10b, wherein a short container is loaded on the truck and a long container is loaded on the attached trailer.

Referring to FIGS. 10*a*-10*d*, lift truck 142 may be fitted with a hitch 144. In one embodiment, hitch 144 is a fifth-wheel type trailer hitch. In those Figures, lift truck 142 is connected via hitch 144 to an external trailer (shown in FIGS. 10*b*, 10*c* and 10*d*). Lift assembly 12 may be operated to push container 300 from its loaded position (FIG. 10*b*) on lift truck 142 onto the trailer bed, preferably from the rear as shown in FIG. 10*c*. As it is moved rearward, container 300 rolls along rollers, and actuators and are operated to keep the angle of container 300 approximately level as container 300 moves from lift truck 142 to the trailer 310. Once container 300 is on the trailer, engagement assembly disengages from container 300, and the lift assembly positions itself and engagement assembly over the carriage, clear of the trailer. The container 300 would then be secured to the trailer 310 as necessary. The load truck can then be loaded with a second container 200, and connected to the trailer 310 carrying the long trailer 300, as shown in FIG. 10*d*. To unload the trailer and/or truck, the steps are performed in reverse order.

In a practical freight loading operation, containers may be loaded from the ground onto a lift truck, then from the lift truck back to a trailer. The lift truck then tows the loaded trailer to its ultimate storage location. The lift truck may be used to load and unload containers in a compact area without damaging the surface on which the freight loading operation is performed. Such loading and unloading operations often must be performed in locations such as department store loading zones and in personal storage unit providers, where the surface is not prepared for heavy duty freight loading operations.

The exemplary embodiments shown in the figures and described above illustrate but do not limit the invention. Other forms, details, and embodiments may be made and implemented. Hence, the foregoing description should not be construed to limit the scope of the invention, which is defined in the following claims

What is claimed is:

1. A cargo storage and transportation system, said system comprising:
    a rectangular cargo container having a front end and a rear end, said cargo container having a bottom defining four corners, said front end corners each having an end port and a side port, said rear end corners each having a bottom port;
    an engagement assembly adapted to engage the container at said front end, said engagement assembly connecting with said front end side ports and at least one of said end ports;
    a movable carriage, said movable carriage comprising a rigid sub-frame flexibly attached to the frame and a plurality of rollers attached to the sub-frame and positioned to bear a portion of the weight of the container during loading; whereby the sub-frame tilts to accept the bottom of the container as the container is loaded and the container rolls on the rollers during loading, said movable carriage further comprising a guide having a planar face, moveable to an engaged position wherein the face is oriented toward the container when loaded, and is moveable to a disengaged position other than the engaged position, wherein the guide in the engaged position prevents the container from shifting sideways while the container is in motion; and said movable carriage further comprising a third actuator attached to the guide, configured to move the guide to the disengaged position and to the engaged position;
    a lift assembly pivotally affixed to the carriage, said lift assembly comprising a first arm pivotally connected to a second arm, said second arm connecting with said engagement assembly, wherein a first actuator interconnects said carriage and said first arm, and wherein a second actuator interconnects said first arm and said second arm; and
    a control system operable to cause the engagement assembly to engage the container, to cause the lift assembly to raise and lower the container; and to move the carriage underneath a portion of the container;
    whereby the container may be loaded from the ground onto the carriage without sliding any portion of the container that is in contact with the ground.

2. The system of claim 1, wherein the control system comprises a hydraulic pump driving a power takeoff unit.

3. The system of claim 1, wherein the control system comprises a computer.

4. The system of claim 1, wherein the movable carriage comprises:
    at least one wheel in contact with the ground and supporting at least a portion of the weight of the movable carriage; and
    an engine operable to move the movable carriage and operable to power the lift assembly.

5. The system of claim 1, wherein the movable carriage comprises a roadworthy truck.

6. The system of claim 1, wherein said engagement assembly comprises a pair of fixed pins configured for insertion into said end ports and a pair of movable pins configured for insertion into said side ports, thereby releasably connecting the container to said movable carriage.

7. The system of claim 1, further comprising a first locking assembly configured for connecting with the first of said rear end corners and a second locking assembly configured for connecting with the second of said rear end corners.

8. The system of claim 7, wherein said locking assemblies insert into and lock within said bottom ports thereby locking said container to said movable carriage.

9. The system of claim 1, wherein the engagement assembly comprises a rigid bridle.

10. The system of claim 1, wherein the engagement assembly comprises a structure configured to engage and disengage a feature on the container.

11. The system of claim 1, wherein the movable carriage comprises a rigid frame adapted to support the lift assembly, the frame having a side, a front end, and a rear end.

12. The system of claim 1, wherein the guide is located nearer the rear end than the front end.

13. The system of claim 1, wherein the third actuator is a hydraulic actuator.

14. A cargo storage and transportation system, said system comprising:
    a rectangular cargo container having a front end and a rear end, said cargo container having a bottom defining four corners, said front end corners each having an end port and a side port, said rear end corners each having a bottom port;
    an engagement assembly adapted to engage the container at said front end, said engagement assembly comprising a rigid bridle connecting with said front end side ports and at least one of said end ports, wherein said engagement assembly comprises a pair of fixed pins configured for insertion into said end ports and a pair of movable pins configured for insertion into said side ports, thereby releasably connecting the container to a movable carriage;

said movable carriage, said movable carriage having at least one wheel in contact with the ground and supporting at least a portion of the weight of the movable carriage, and an engine operable to move the movable carriage and operable to power the lift assembly, said movable carriage further comprising:

a rigid frame adapted to support the lift assembly, the frame having a side, a front end, and a rear end;

a rigid sub-frame flexibly attached to the frame; and a plurality of rollers attached to the sub-frame and positioned to bear a portion of the weight of the container during loading; whereby the sub-frame tilts to accept the bottom of the container as the container is loaded and the container rolls on the rollers during loading;

a guide having a planar face, moveable to an engaged position wherein the face is oriented toward the container when loaded, and is moveable to a disengaged position other than the engaged position, wherein the guide in the engaged position prevents the container from shifting sideways while the container is in motion; and a first actuator attached to the guide, configured to move the guide to the disengaged position and to the engaged position;

a lift assembly pivotally affixed to the carriage, said lift assembly comprising a first arm pivotally connected to a second arm, said second arm connecting with said engagement assembly, wherein a second actuator interconnects said second arm and said first arm, and wherein a third actuator interconnects said carriage and said second arm;

a control system operable to cause the engagement assembly to engage the container, to cause the lift assembly to raise and lower the container; and to move the carriage underneath a portion of the container; and a first locking assembly configured for connecting with the first of said rear end corners and a second locking assembly configured for connecting with the second of said rear end corners, wherein said locking assemblies insert into and lock within said bottom ports thereby locking said container to said movable carriage;

whereby the container may be loaded from the ground onto the carriage without sliding any portion of the container that is in contact with the ground.

* * * * *